Patented Aug. 19, 1941

2,253,043

UNITED STATES PATENT OFFICE 2,253,043

COOKING TEMPERATURE GUIDE

Irving Nachumsohn, Chicago, Ill.

Application September 2, 1937, Serial No. 162,208

4 Claims. (Cl. 236—15)

My invention relates to the cooking apparatus described in my United States Patent 2,187,888 issued January 23, 1940, and more particularly to the charted means illustrated therein for setting and maintaining desired cooking temperatures, and the present application has for its object to present such means independently and in greater detail.

Primarily, the charted temperature setting and maintaining means serve as a guide to the user of the cooking apparatus covered in my pending application, one object of the guide being to supply the user with immediate and proven information as to the time required for cooking various foods.

A further object of the novel guide is to provide simple means for setting the heating unit in the cooking apparatus to operate at temperatures prescribed for the proper cooking of various foods.

Another object of the invention is to provide a guide in the front of the cooking apparatus which does not require any knowledge of cooking or cooking temperatures on the part of the user, serving as a built-in cook-book and automatic cooking-temperature selector.

A still further object of the invention is to design the novel guide along lines of simplicity and unlimited versatility.

An important object of the invention is to construct the novel guide with parts which are few and a mechanism which is simple and dependable.

With the above objects in view and any others which may suggest themselves from the description to follow, a better understanding of the invention may be gained by reference to the accompanying drawing, in which—

Fig. 1 is a plan section of the novel guide;

Fig. 2 is a front elevation, partly broken away;

Fig. 3 is a vertical section taken on the line 3—3 of Fig. 1; and

Fig. 4 is a plan view of a guide chart.

Since the novel guide forms a part of the apparatus in my pending application, the views in the drawing are necessarily counterparts of the main views in the said application, except that only so much is illustrated in the present case as pertains to the guide, and on a larger scale for purposes of clarity. Thus, specific reference to the drawing indicates the front wall of the cooking apparatus at 12, the frontal closure plate at 41, at inner wall at 6, and a frontal housing for the guide at 39.

The frontal housing 39 contains a horizontal rod 38, which extends endwise from the housing to form a pintle for the hinged mounting of a frontal door 42, the latter having a knob 69 at the top to enable the door to be readily opened to a position such as indicated by dotted lines in Fig. 3 for access to the interior of the housing 39.

The door 42 is fitted with a window 43 on the back of which is applied or etched a graduated scale 45, the position of the same being at the upper part of the window. The scale is of Fahrenheit temperature degrees, and is accessory to a system of indicators representing cooking temperatures in my apparatus.

Inside the housing 39 a shelf 53a or other suitable support is provided for one or more guide charts 53. Only the frontal guide chart is intended to be in use, the others merely being spare charts which may be kept elsewhere if desired. The frontal chart 53 is representative of a certain food or foods, while the other charts represent other foods or varieties thereof. Therefore, the user may pick any desired chart and place it so as to appear in view through the window 43.

In order that a chart may serve as an accurate guide to inform the user of the proper temperature required for cooking certain foods in my apparatus, means indicative of predetermined cooking temperatures are employed. Such means consist of index lines 54 printed or otherwise marked on the chart, each relating to a food or group of foods adapted to be best cooked in my apparatus at a given temperature. Thus, the first index line represents such a temperature for a certain group of foods, the next index line a higher temperature for another group of foods, and so on in progressive order. In addition, the cooking time or period for each food is also handily marked, it being understood that the proper cooking temperatures and periods were ascertained and proven by repeated tests and experiments in my cooking apparatus.

The locations of the index lines 54 are indicative of points in a variable temperature control at which the predetermined temperatures are obtained. These need not be ascertained or known in terms of Fahrenheit or centigrade, but the scale 45 is provided over the index chart in case this information is desired in connection with a given index line.

The variable temperature control just referred to primarily involves a pointer 44 slidably mounted on the rod 38 inside the housing 39, the pointer having a frontal bottom projection 37 to serve as a handle. As shown in Fig. 2, the left-hand end of the scale 45 has an "off" legend, and when the pointer 44 is set opposite the same the current of the heating unit is cut off. However, as the pointer is slid to the right it may be stopped at any index line 54 representing the food group containing the particular food desired to be cooked.

The pointer 44 procures the temperature settings represented by the index lines 54. Thus, the temperature control in my cooking apparatus is thermostatic and contained in a metal case 35 located inside the apparatus. The case is firmly supported by a tubular strut 55 which is rigidly connected at its frontal end to the plate 41 and at its rear end to the case 35. Inside the latter is a receptacle 32 of porcelain or other refractory material. The frontal wall of the receptacle carries a spring blade 31, while the rear wall thereof carries a spring blade 29. The outer ends of these blades carry normally-spaced contact points 31. The said rear wall also carries a bimetal thermostatic strip 28 directed to the blade 29. The connections of the blades 29 and 30 are extended in the form of electrical conductors 33 and 34 which are parts of the heating unit circuit.

Inside the housing 39 the plate 41 carries a pivot bearing 49 near the left-hand end of the housing for a horizontal bar 48, which is preferably of square cross-section. The bar 48 extends slantwise from the pivot towards the front of the housing, and is maintained there normally by a pin 50 freely slidable in the tubular strut 55, the spring blade 30 serving as a backing for the insulation 51 forming the rear end of the pin.

With the parts positioned as indicated by full lines in Fig. 1, the points 31 are spaced and the heater circuit is inactive. However, when the pointer handle 37 is moved towards the right, an internal projection 46 of the pointer acts as a cam along the bar 48 to urge the same in an inward direction. This action first impinges upon the blade 30 with the effect of closing the contacts 31 and putting the heating unit in action.

The further movement of the handle 37 has the effect of backing the blade 29 away from the thermostatic strip 28, so that the parts involved appear as indicated by dotted lines in Fig. 1. Thus, the heating unit is in operation and the thermostat acts upon the blade 29 to separate the contacts 31. It is obvious now that the further the handle 37 is moved towards the right, the longer will the thermostatic action to break the circuit be deferred. In effect, the settings of the pointer 44 in its progress towards the right procures and maintains progressive degrees of temperature in the cooking apparatus.

It will be evident from the above description that I have provided a guide which accomplishes several important purposes. First, it provides a versatile selection of charts related to various foods or food combinations previously proven in preparation with the present cooking apparatus and adapted to be cooked therein, such charts forming a handy built-in directory for reference by the user when a desired food is sought for or in case the user wants to find out what to cook at the particular time. Second, the charts 53 furnish the user with information as to the length of time required for foods known as cooked, roasted, fried, broiled or baked, since my cooking apparatus is designed to accomplish these various forms or conditions of cooking. Third, the temperature at which each food is cooked in the particular or desired form is conveniently indicated in conjunction with each group of foods for which such temperature is suitable, presenting the information in compact and tabulated form. Fourth, the guide simply and readily procures the desired temperature by the setting of the pointer to the chosen food index line without requiring the user to have any knowledge whatsoever of the requisite temperature for cooking the particular food chosen. In other words, it is common knowledge that even experienced cooks are not concerned with the terms—in Fahrenheit or centigrade degrees—of cooking temperatures but rather depend on the frequent observation of the foods being cooked, adjusting the heat accordingly. On the other hand, one could have a most elaborate cook book available, with cooking temperatures or periods prescribed, yet be obliged to not only search for the food desired but also to go through the mental process of ascertaining and memorizing the temperature prescribed. In this respect prescribed cooking temperatures do not meet identical conditions wherever applied, since, for example, ovens vary in heat distribution, internal air-current convection, ratio between radiated and conducted heat, etc. Since the various recipes on the charts have been carefully tested and proven beforehand in the specific cooking apparatus described, and the respective index lines accurately applied to correspond, such index lines form a simple and reliable indication that the proper cooking temperature is provided for the chosen food, the degree of the same being incidental and therefore of no concern to the user. In other words, a blind temperature setting occurs at the mere selection of a food about to be cooked.

Further, the present guide provides a cook book where an index is mechanically movable to any desired food to remain thereat as an indication of what food is being cooked. This is an advantage over the choice of the food from an outside cook book, since the latter may have many other foods listed, and the reader may forget what food was originally chosen and have to again look it up in the cook book, whereas in my guide the setting of the pointer shows what food was chosen until such time as the position of the pointer is changed. This item may also be of value in a restaurant equipped with several of my cookers simultaneously in use, making it easy to ascertain at a glance the different foods which are being prepared in each cooker. In such an instance, since time indicia are located adjacent the respective foods on the charts of the respective cookers—assuming all of the cookers are started simultaneously or at known times—each cooker is tabbed at which time it should be shut off.

In connection with the guide, a preferred form of thermostatic control has been described and illustrated. However, I do not limit myself to the particular type of thermostatic control, since any mechanism which will act as a switch and thermostat through the initial and progressive positions of the pin 50 will accomplish the effect anticipated by the use of the guide. From a mechanical or structural point of view, the novel guide is exceedingly simple and handy; and it is built as a part of the wall structure of the cooking apparatus. In fact, the frontal wall plate 41 serves as a rigid support for the tubular strut 55 and the thermostat case 35, so that possible deviations in the position of the latter will not prejudice the free action of the pin 50. Further, the elongated nature and slight angle of the control bar 48 give the pointer projection 46 a gradual degree of adjustment, so as to provide a wide range of temperature control. Moreover, the bar 48 may be curved to progressively vary the degree of its deflection during manual control in order to compensate for any non-uniform action of the thermostatic element or to change the rate of control for any other reason. Finally, the novel guide only presents the form of a neat and small panel in front of the cooking apparatus, concealing the major portion of its mechanism from view.

I claim:

1. Cooking apparatus having a thermostat with a variable temperature-control member, a display receptacle on said apparatus, a set of charts grouped in the receptacle and with a chosen chart placed in view, each chart having a variety of food listings for which prescribed cooking temperatures are required when cooked in said apparatus, and means associated with any chart on display and connected to said variable temperature-control member for the setting of such temperatures in the apparatus as suit foods in any listing chosen from such chart, said means comprising a manual temperature control for the same movable relatively to the displayed chart to procure different cooking temperatures in the apparatus, and an index mark for each listing positioned at a point in the path of said control corresponding to a predetermined temperature setting for the particular listing.

2. In cooking apparatus comprising inner and outer shells, a heating element and an adjustable thermostat associated with said inner shell to maintain the temperature therein at a desired degree, a chart-supporting closure supported by said outer shell, a plurality of charts supported within said closure with a chosen chart placed in view, an index member cooperating with the chosen chart and movable in relation thereto and adjustable means connecting said thermostat and member and effective upon the setting of the latter to set the thermostat for a predetermined degree.

3. A cooking apparatus having a front wall, a guide compartment in front of said wall and a thermostat to the rear thereof containing a temperature-adjusting member, a linear selection chart in the guide compartment and means associated with the chart for the setting of a prescribed cooking temperature in said apparatus for the food selected to be cooked, said means comprising a manual actuator in the guide compartment slidable along the chart, a pivoted bar in said compartment extending at an angle to the path of the actuator, the latter sliding along one edge of the bar, whereby the same is swingable in response to the advance of the actuator, means connecting the free end of the pivoted bar with the temperature-adjusting member of the thermostat, to constitute the latter a variable temperature control responsive to the movement of the actuator.

4. A temperature guide for a cooking apparatus comprising a chart receptacle and a plurality of different food selection charts quickly detachable and selectively placeable thereon with a chosen chart in view, means associated with the latter for the setting of a prescribed cooking temperature in said apparatus for the food selected to be cooked, the foods represented in each chart being suitable for cooking in the apparatus at prescribed temperatures and listed in progressive temperature sequence on each chart, and said means comprising a thermostat, a manual actuator cooperating with the chosen chart and movable along said food listings, and connecting means movable by the movement of the actuator, for controlling the thermostat as the actuator assumes a position opposite each listing to procure the temperature required thereby.

IRVING NACHUMSOHN.